United States Patent
Froehlich et al.

(10) Patent No.: US 8,559,967 B2
(45) Date of Patent: Oct. 15, 2013

(54) SYSTEM AND METHOD FOR MANAGING SUBSCRIBER BANDWIDTH BASED ON CELL CONGESTION ANALYSIS

(75) Inventors: Robert W. Froehlich, McKinney, TX (US); Fang Tang, Plano, TX (US); Shankar Selvavinayagam, Flower Mound, TX (US)

(73) Assignee: Tektronix, Inc., Beaverton, OR (US)

(*) Notice: Subject to any disclaimer, the term of this patent is extended or adjusted under 35 U.S.C. 154(b) by 52 days.

(21) Appl. No.: 12/870,592

(22) Filed: Aug. 27, 2010

(65) Prior Publication Data
US 2012/0052866 A1    Mar. 1, 2012

(51) Int. Cl.
*H04B 17/00*    (2006.01)
*H04W 72/00*    (2009.01)

(52) U.S. Cl.
USPC ............... 455/453; 455/67.11; 455/452.1; 455/452.2

(58) Field of Classification Search
USPC .................. 455/67.11, 452.2, 452.1
See application file for complete search history.

(56) References Cited

U.S. PATENT DOCUMENTS

| | | | |
|---|---|---|---|
| 2002/0160811 A1* | 10/2002 | Jannette et al. | 455/560 |
| 2005/0041584 A1* | 2/2005 | Lau et al. | 370/235 |
| 2005/0108444 A1* | 5/2005 | Flauaus et al. | 710/15 |
| 2006/0067270 A1* | 3/2006 | Gilliland et al. | 370/329 |
| 2006/0176810 A1* | 8/2006 | Kekki | 370/229 |
| 2006/0291383 A1* | 12/2006 | Bi et al. | 370/229 |
| 2008/0242301 A1* | 10/2008 | Osterling et al. | 455/436 |
| 2008/0268864 A1* | 10/2008 | Andersson et al. | 455/453 |
| 2010/0124933 A1* | 5/2010 | Chowdhury et al. | 455/453 |
| 2011/0261695 A1* | 10/2011 | Zhao et al. | 370/232 |

OTHER PUBLICATIONS

Universal Mobile Telecommunication System (UMTS); Radio Resource Control (RRC) protocol specification (3GPP TS 25.331 version 7.0.0 release 7) p. 523 http://www.etsi.org/deliver/etsi_ts/125300_125399/125331/07.00.00_60/ts_125331v070000p.pdf.*
Universal Mobile Telecommunication System (UMTS); UTRAN Iub Interface NBAP signaling (3G TS 25.433 version 3.0.0 release 1999) p. 109 http://www.etsi.org/deliver/etsi_ts/125400_125499/125433/03.00.00_60/ts_125433v030000p.pdf.*

* cited by examiner

*Primary Examiner* — Vladimir Magloire
*Assistant Examiner* — Edd Rianne Plata
(74) *Attorney, Agent, or Firm* — Edwards Wildman Palmer LLP; Scott D. Wofsy; George N. Chaclas

(57) ABSTRACT

A system and method for enforcing network policies is disclosed. Data is captured from network interfaces. A cell congestion level is determined from the captured data. Cells having a congestion level above a first threshold are identified. A first alert is transmitted to a network policy management entity when the cell is above the first threshold. Cells having a congestion level above a second threshold are identified. A second alert is transmitted to the network policy management entity when the cell is above the second threshold. The first threshold set at a point below a maximum capacity of the cell, and the second threshold set at a point near or at the maximum capacity of the cell.

19 Claims, 6 Drawing Sheets

US 8,559,967 B2

SYSTEM AND METHOD FOR MANAGING SUBSCRIBER BANDWIDTH BASED ON CELL CONGESTION ANALYSIS

TECHNICAL FIELD

Embodiments are directed, in general, to monitoring network cell congestion and, more specifically, to enforcing network policies for subscribers in near congestion and congested cells.

BACKGROUND

The latest smart phones and wireless air cards allow mobile devices to consume large amounts of wireless network bandwidth. With bandwidth demand exploding in mobile networks, service providers must expand their radio networks to keep up with data growth. However, adding radio transmitters to keep up with bandwidth growth is not always possible or economical. Mobile service providers spend billions of dollars to upgrade Radio Access Networks (RAN) to support the demand for data services. Additionally, radio frequency (RF) spectrum limitations and interference caused by expanding the RF channels make RAN engineering an extremely difficult task.

In addition to expanding the RAN, service providers may also use policies to control network traffic. Core network (CN) elements, such as Policy Decision Points (PDP) and Policy Enforcement Points (PEP), are designed to shape traffic based on predetermined policies. These policies are based on the subscriber's class or the bandwidth provisioned to the subscriber.

SUMMARY

Currently, the PDP/PEP systems manage traffic across all subscribers without regard to the current status of the cell serving each subscriber. The systems and methods disclosed herein provide a solution to the bandwidth-availability problem by applying policies only to those subscribers who reside in congested cells. Embodiments provide data concerning the current status and quality of an RF cell to a Policy Charging and Control (PCC) function. For example, the state or level of cell congestion is determined from network signaling. The cell congestion information is forward to PCC systems, which enforces polices based upon cell congestion.

This allows for the implementation of improved policy rule sets that take into account the current status of the RF cell and can degrade the available bandwidth for certain equipment to prevent devices from exceeding their fair share of cell capacity.

BRIEF DESCRIPTION OF THE DRAWINGS

Figure 1:
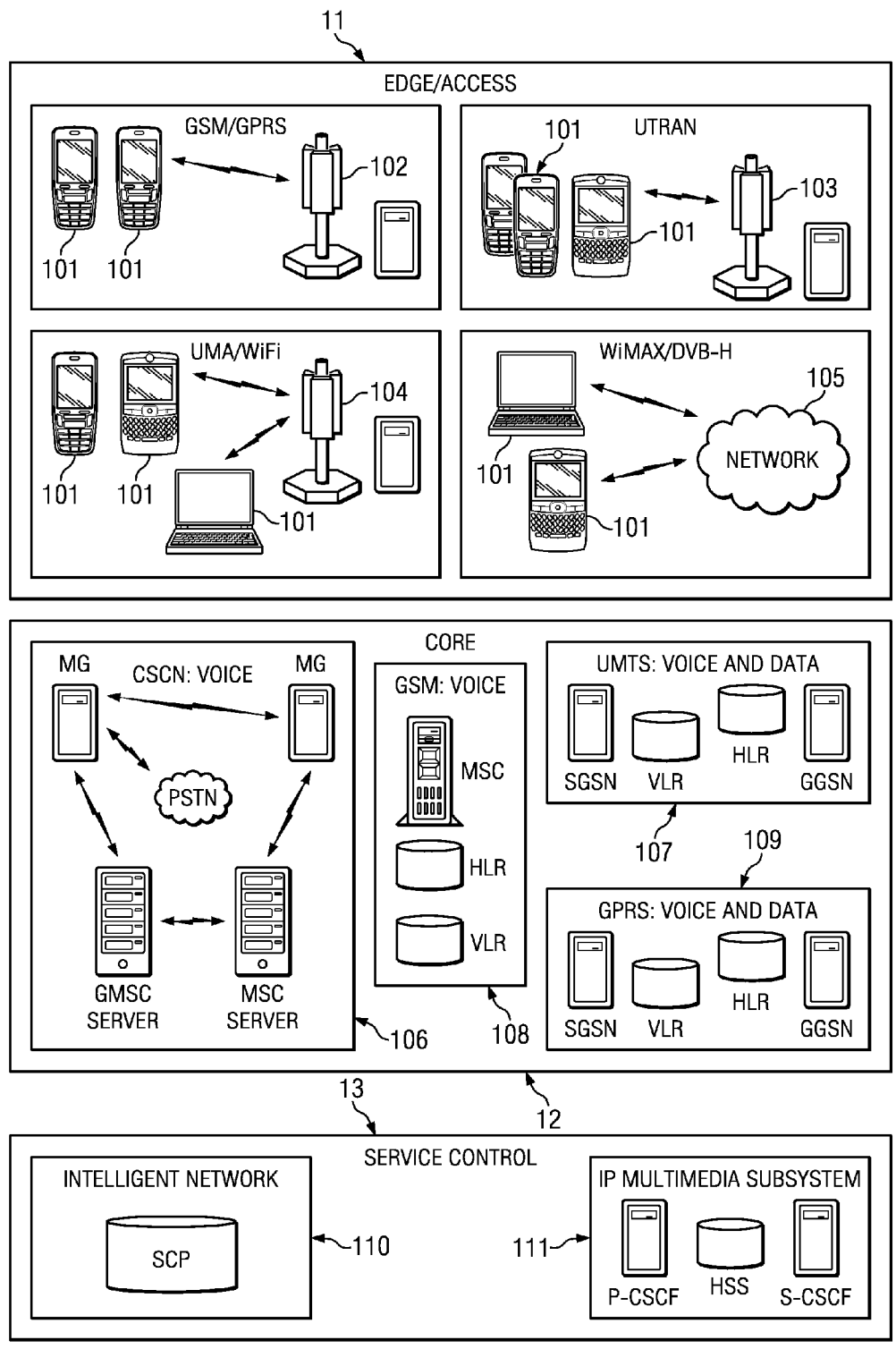
Figure 2:
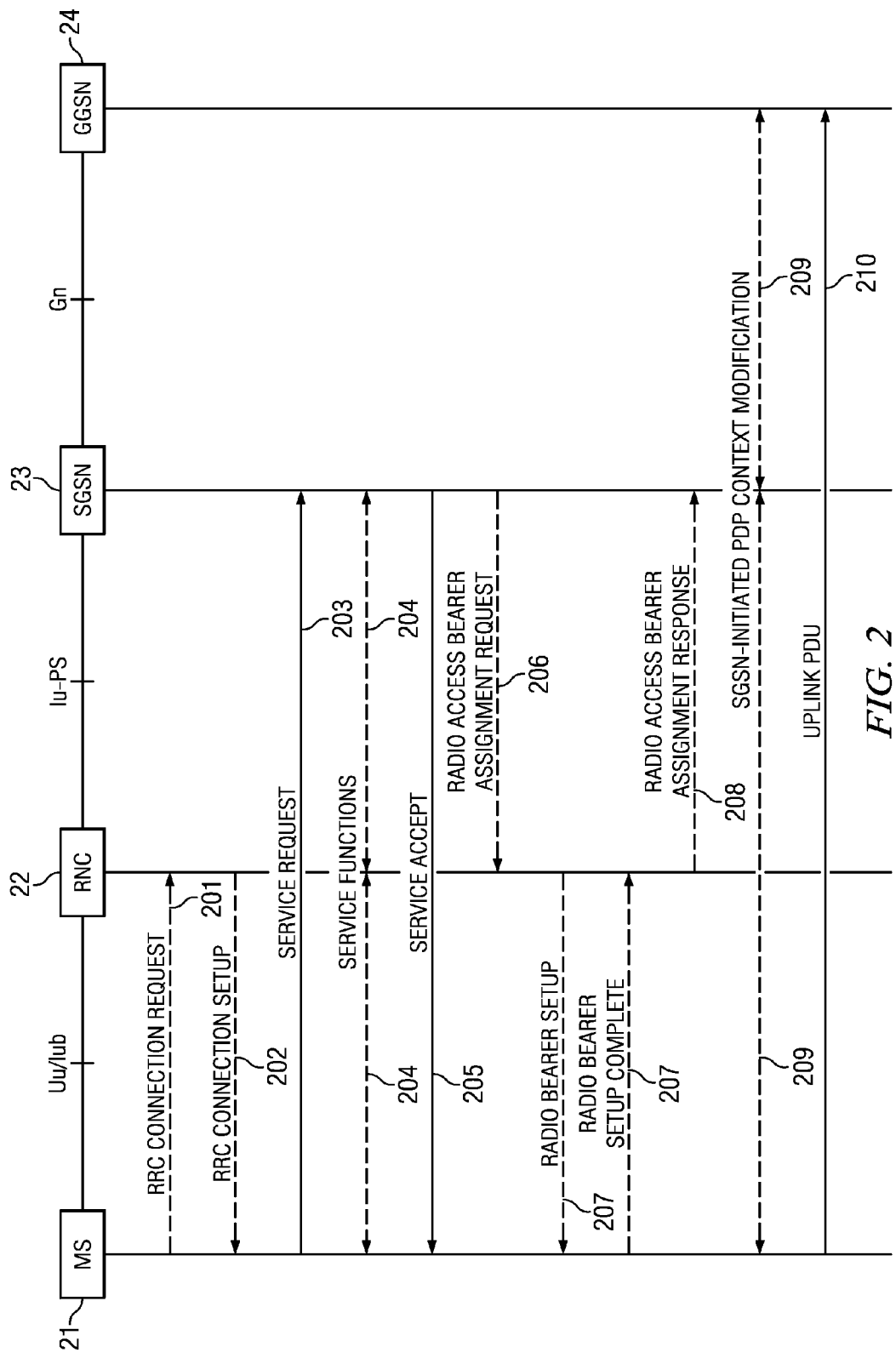
Figure 3:
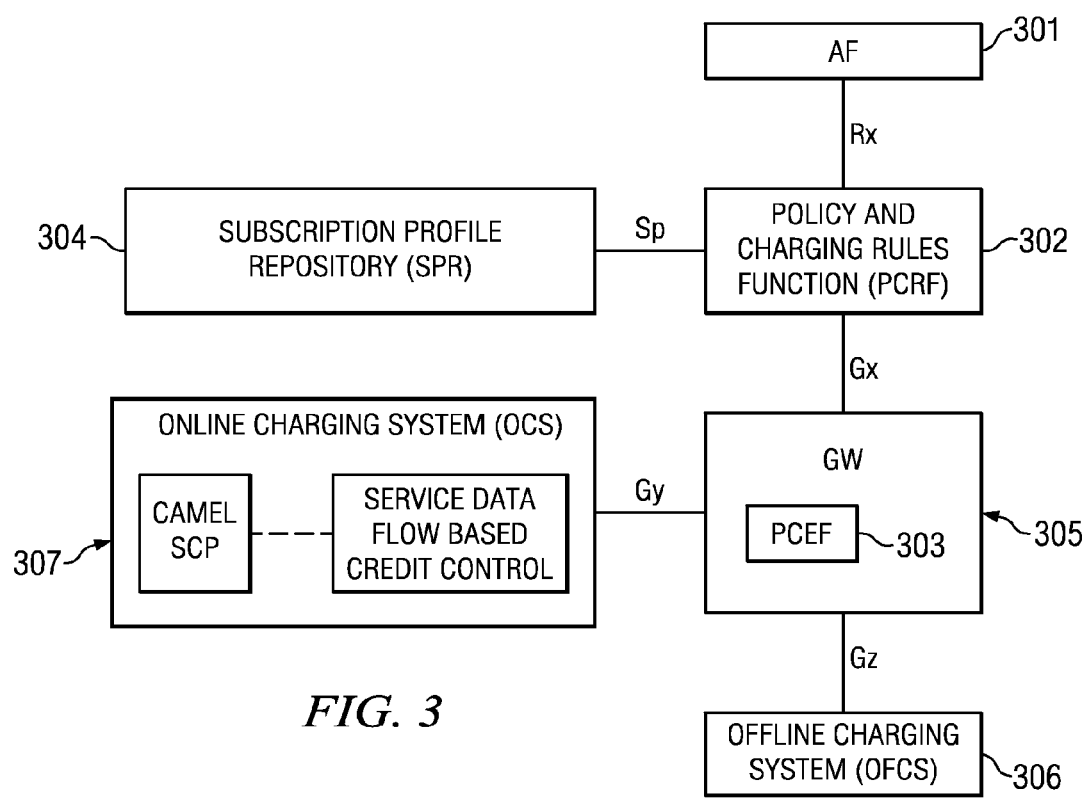
Figure 4:
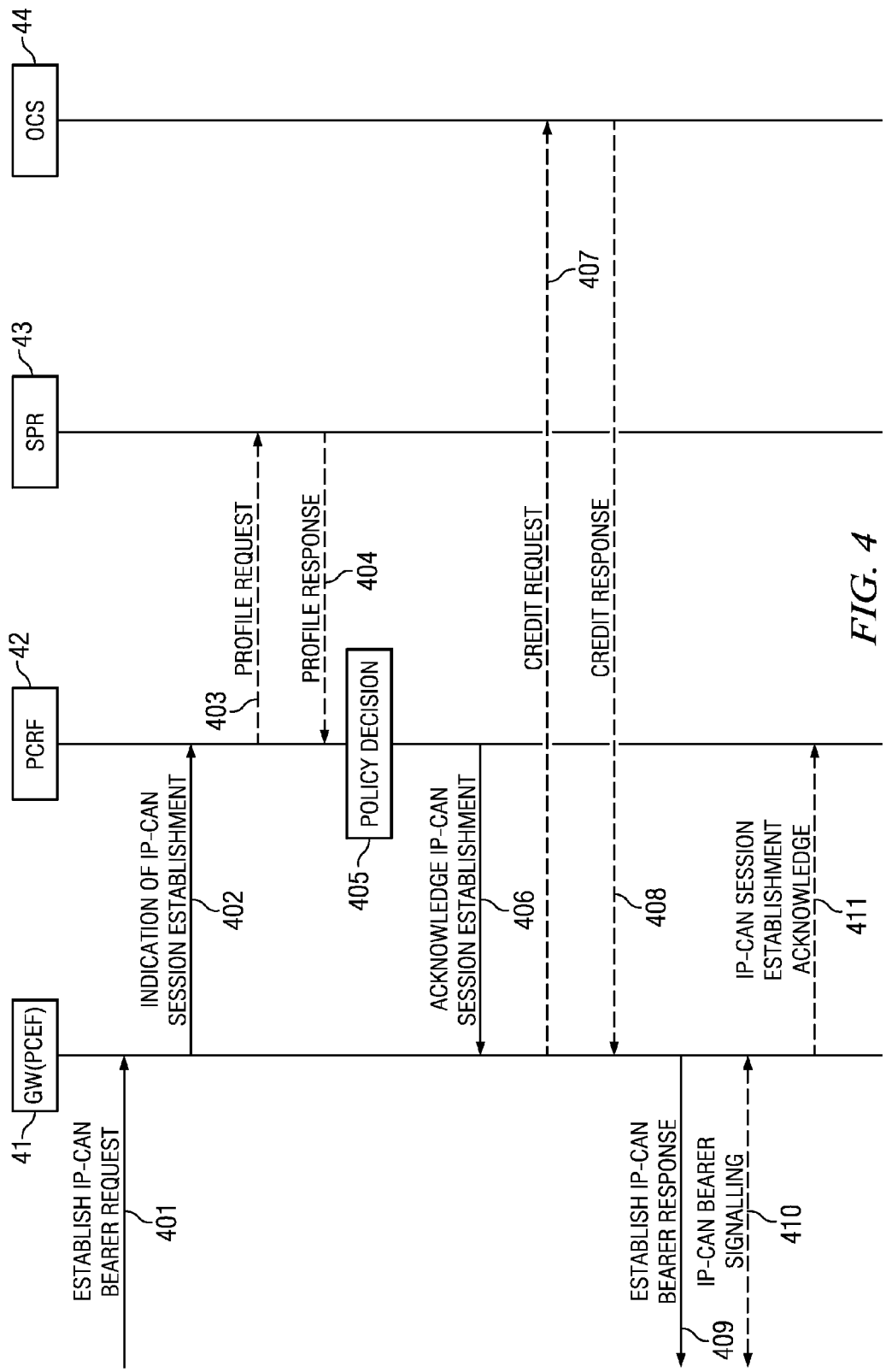
Figure 5:
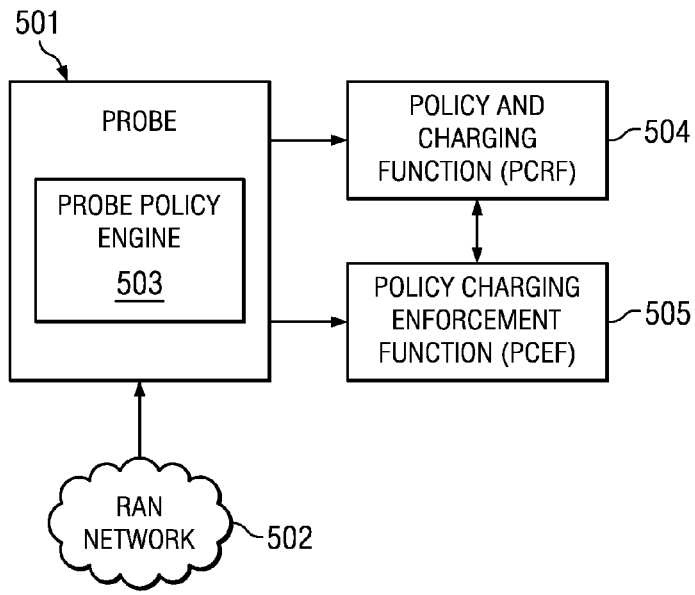
Figure 6:
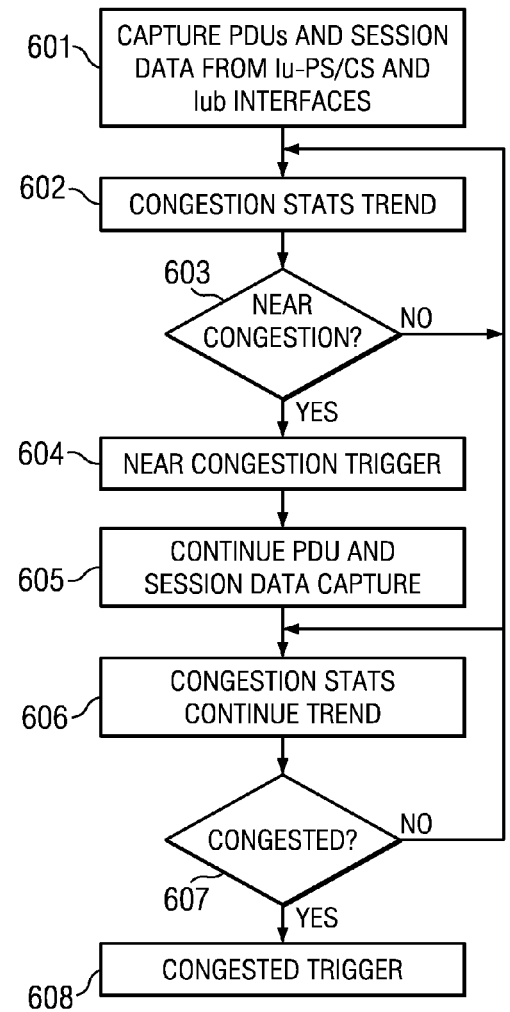
Figure 7:
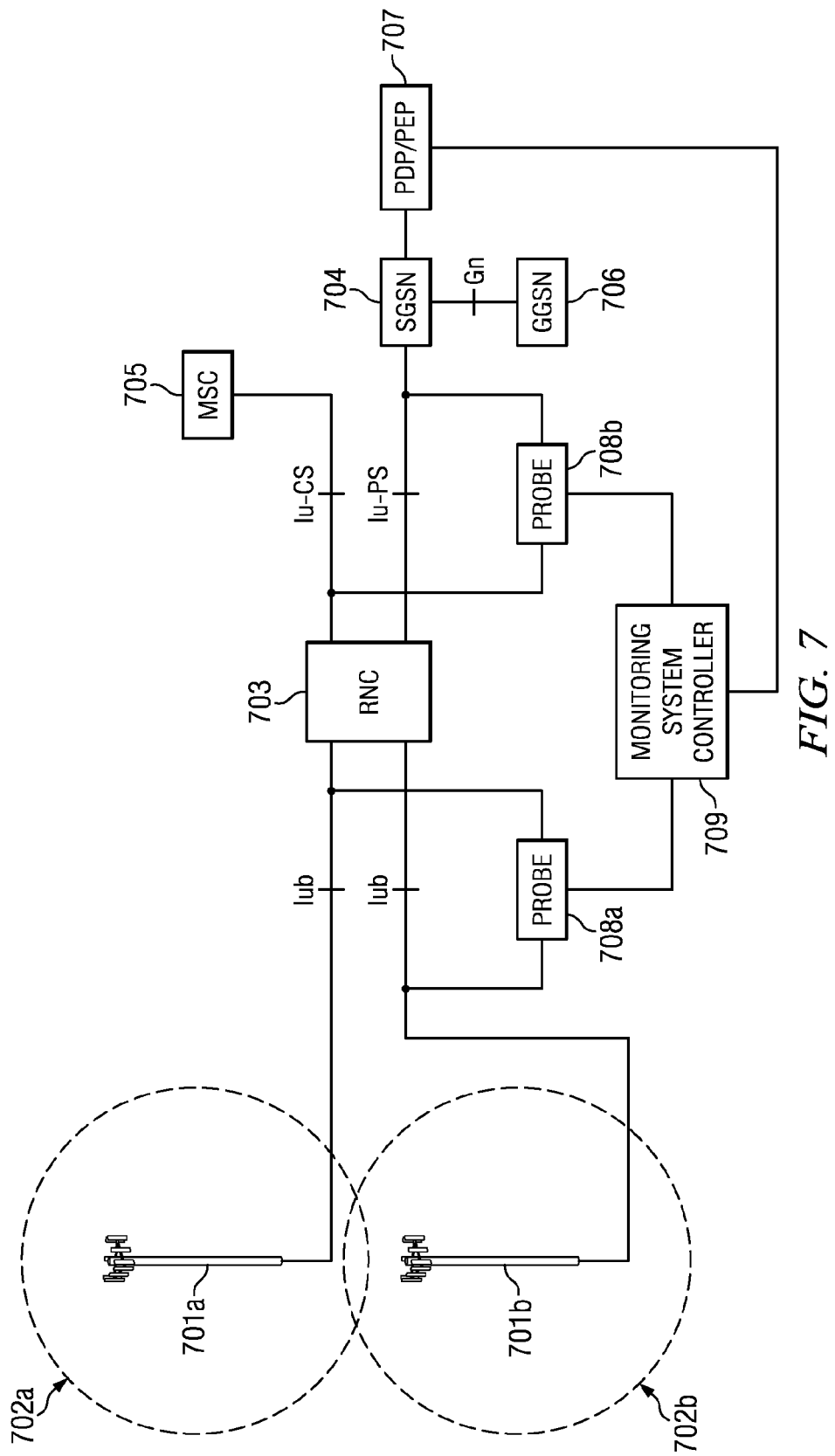

Having thus described the invention in general terms, reference will now be made to the accompanying drawings, wherein:

FIG. 1 is a high-level overview of a typical mobile network;

FIG. 2 illustrates the existing data flow for a subscriber-initiated service request procedure on a UTRAN network;

FIG. 3 illustrates the logical architecture of the PCC function;

FIG. 4 illustrates an IP-CAN session establishment procedure;

FIG. 5 is an exemplary architecture of a triggering function according to one embodiment;

FIG. 6 is a flowchart illustrating a cell congestion algorithm using Protocol Data Units (PDUs) captured from the radio access network, such as PDUs on the Iub and IuPS/IuCS interfaces;

FIG. 7 is a high-level block diagram of components in a UMTS network.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a high-level overview of a typical mobile network having edge/access devices 11 in which subscribers having user equipment (UE) 101 communicate with different network devices, such as base station 102 in a GSM/GPRS network, NodeB 103 in a UMTS Terrestrial Radio Access Network (UTRAN) network, access point 104 in a WiFi (IEEE 802.11) or Unlicensed Mobile Access (UMA) network, or access network 105 in a WiMax (IEEE 802.16) or Digital Video Broadcasting—Handheld (DVB-H) network. User equipment 101 accesses the core network 12 via the edge/access devices 11.

Depending upon the access network and the requested services or applications, data from UE 101 may be transmitted to Circuit Switched Cellular Network (CSCN) network 106, Universal Mobile Telecommunications System (UMTS) network 107, Global System for Mobile Communications (GSM) network 108, or General packet radio service (GPRS) network 109. Core networks 12 may be coupled to service control networks 13, such as Intelligent Network (IN) 110 which provides value-added services. Additionally, core networks 12 may be coupled to IP Multimedia Subsystem (IMS) 111 components, such as a Proxy Call Session Control Function (P-CSCF), Serving Call Session Control Function (S-CSCF), or Home Subscriber Server (HSS).

A service provider can establish policies that control how subscribers are handled within the network. In one embodiment, the policy enforcement is based upon cell congestion. If the service provider knows what types of subscribers are using the network and can identify where cell congestion occurs, then the service provider can throttle certain services to open up the available bandwidth in the network. The service provider must identify which subscribers are entering a cell, which subscribers are leaving a cell, and which subscribers are current in the cell to identify congested cells. Radio Resource Control (RRC) messages on the Iub interface can be used to identify which subscribers are in a cell. Radio Access Bearer (RAB) messages occur when an attached subscriber attempts to make a call. By identifying which subscribers are using the bandwidth and the type of use (e.g. voice, high speed data, low speed data), the service provider can identify when a cell is approaching or at congestion. The network can provide alerts or triggers to a Policy Decision Point (PDP) when near congestion or congestion occurs for a cell. Subscriber data and services can then be controlled to reduce the cell congestion or to minimize the effects of the cell congestion.

FIG. 2 illustrates the existing data flow for a subscriber-initiated service request procedure on a UTRAN network. The expected behavior of the RAN is to deliver the requested data service and tear the radio bearers down, which allows other subscribers to access the radio network. The UE or Mobile Station (MS) 201 establishes an RRC connection by sending RRC Connection Request message 201 to Radio Network Controller (RNC) 22 across the Uu (MS to Node B) and Iub (NodeB to RNC) interfaces. RNC 22 responds with RRC Connection Setup message 202. MS 21 then sends Service Request message 203 to Serving GPRS Support Node (SGSN). The service type in Service Request message 203 specifies the data or signaling service requested by the subscriber. When the service type indicates data, MS 21 may also include Packet Data Protocol (PDP) context activity information to indicate which PDP contexts need to transfer data.

If service request 203 was initiated by MS 21 in PMM-IDLE state, then SGSN 23 performs security functions 204. If the network is in PMM-CONNECTED state and the Service Type indicates data, then SGSN 23 responds with Service Accept message 205 towards MS 201 when the service request can be accepted. When the service type indicates data, SGSN 23 sends a Radio Access Bearer Assignment Request message 206 to re-establish radio access bearers for PDP contexts. The Radio Access Bearer Assignment Request message comprises Network Layer Service Access Point Identifier (NSAPI)/RAB IDs, Tunnel Endpoint Identifiers (TEIDs), Quality of Service (QoS) Profiles, and SGSN IP Addresses.

If Direct Tunnel is established, SGSN 23 provides to the RNC 22 the GGSN's User Plane Addresses and TEIDs for uplink data instead of the SGSN's IP Addresses and TEIDs. SGSN 23 may additionally use PDP context activity information provided by MS 21 in Service Request message 203 to decide which Radio Access Bearers (RAB) to set up.

RNC 22 indicates to MS 21 the new Radio Bearer Identity established and the corresponding RAB ID with the RRC radio bearer setup procedure 207. RNC 22 sends Radio Access Bearer Assignment Response message 208 comprising RAB IDs, TEIDs, QoS Profiles, RNC IP Addresses. GPRS Tunneling Protocol (GTP) tunnels are established on the Iu-PS interface. If RNC 22 returns a Radio Access Bearer Assignment Response message with a cause indicating that the requested QoS profile(s) cannot be provided (for example, "Requested Maximum Bit Rate not Available"), SGSN 23 may send a new Radio Access Bearer Assignment Request message with different QoS profile.

For each RAB re-established with a modified QoS profile, SGSN 23 initiates a PDP Context Modification procedure 209 to inform the MS and the GGSN 24 of the new negotiated QoS profile for the corresponding PDP context. MS 21 sends uplink packets 210 to GGSN 24.

FIG. 3 illustrates the logical architecture of the Policy Charging and Control (PCC) function. QoS demands vary by subscriber and service. QoS changes may require the charging and billing system to select an appropriate charging mode. Application Function (AF) 301 is a functional entity that provides applications that implement appropriate policy and/or charging controls. AF 301 provides dynamic application session information to the Policy and Charging Rules Function (PCRF) 302.

PCRF 302 includes policy control decision functions. PCRF 302 implements service flow-based detection, access control, QoS authorization, and flow-based charging on the Policy and Charging Execution Function (PCEF) 303. PCRF 302 determines if AF 301 service information is consistent with pre-defined policy and with user subscription information derived from the subscription profile repository (SPR) 304. PCRF 302 generates rules according to the SPR information and sends the rules to the PCEF 303.

PCEF 303 enables policy execution and flow-based charging functions, and is located in gateway (GW) 305. The PCEF 303 controls user plane traffic and QoS, detects and measures service data flows, and interacts with the online/offline charging system. PCEF 303 executes QoS and access control for service data flows according to PCC rules, and reports related service data flow changes to the PCRF 302.

GW 305 is connected to Offline Charging System (OFCS) 306, which provides post-service charging, and Online Charging System (OCS) 307, which may provide real-time charging control and correlation. The charging system can configure charging policies and correlates charging information with data flows. Charging correlation is achieved by exchanging an IMS charging identifier (ICID), a bearer network's GPRS charging identifier (GCID), or a charging identifier FlowNumber (when Flow Based Chargin (FBC) is enabled) that identifies service data flows in the resource reservation and negotiation process. A charging data record (CDR) that includes ICID, GCID or FlowNumber data is used by the charging system.

FIG. 4 illustrates an Internet Protocol Connectivity Access Network (IP-CAN) session establishment procedure. GW(PCEF) 41 receives a request 401 for IP-CAN Bearer establishment. GW(PCEF) 41 accepts request 401 and assigns an IP address for the user. The PCEF 41 determines that PCC authorization is required, and sends request 402 to PCRF 42 for authorization of allowed services and PCC Rules information. PCEF 41 includes the following information, if available, in request 402: IP-CAN type, default charging method, and IP-CAN bearer establishment modes supported.

If PCRF 42 does not have the subscriber's subscription information, it sends request 403 to SPR 43 in order to receive the information related to the IP-CAN session. PCRF 42 provides the subscriber ID and, if applicable, the Packet Data Network (PDN) identifier to SPR 43. The PCRF 42 may request notifications from SPR 43 on changes in the subscription information. PCRF 42 stores the information about the allowed services and PCC Rules information received in profile response 404.

PCRF 42 makes the authorization and policy decision 405 based upon the allowed services and PCC rules information. PCRF 42 sends the decisions, including the chosen IP-CAN bearer establishment mode, in acknowledge IP-CAN session establishment message 406 to PCEF 41, which enforces the decision. PCRF 42 may provide the default charging method.

If online charging is applicable and at least one PCC rule was activated, PCEF 41 activates the online charging session and provides relevant input information 407 to OCS 44. Depending on operator configuration, PCEF 41 may request credit from OCS 44 for each charging key of the activated PCC rules. If online charging is applicable, OCS 44 provides credit information to PCEF 41 and may provide re-authorization triggers for each of the credits in credit response 408.

If at least one PCC rule was successfully activated and if online charging is applicable and credit was not denied by OCS 44, GW(PCEF) 41 acknowledges the IP-CAN Bearer Establishment Request in Bearer Response message 409. If network control applies, GW 41 may initiate the establishment of additional IP-CAN bearers 410.

If PCRF 42 requested an acknowledgement based on PCC rules operations in message 406, GW(PCEF) 41 sends the IP-CAN Session Establishment Acknowledge 411 to PCRF 42 in order to inform the PCRF of the activated PCC rules result.

FIG. 5 illustrates an exemplary architecture of a triggering function according to one embodiment of a method of determining cell congestion based on network signaling. Probe 501 passively monitors and collects signaling data from RAN 502. Alternatively, Probe 501 could be an active component (e.g. software agent) on the handset 101 or located on the RAN access interface (e.g. Iub). Probe 501 may collect user plane and control plane data from the Iu and/or Iub interfaces. In other embodiments, passive monitoring or probing may not be required. Instead, RAN components, such as Node Bs, may send or push information or key performance indicators (KPIs) to probe 501 at predetermined intervals or when certain data is identified.

Probe policy engine 503 on probe 501 contains one or more rule sets. The rule sets define when to send triggers based upon the information collected from RAN 501. The triggers may be based on weighted KPIs. The triggers may indicate, for example, the congestion or non-congestion of cells in RAN 502. Probe policy engine 503 analyzes the collected signaling data and processes variables. When a policy trigger is identified, probe policy engine 503 sends a message, such as a congestion trigger, to either PCRF 504 or PCEF 505. PCRF 504 may function as a Policy Decision Point (PDP). PCEF 505 may function as a policy enforcement point (PEP). The information contained in the congestion trigger may include cell and subscriber identifiers, type of service, time of day, and type of radio bearers used FIG. 6 is a flowchart illustrating a cell congestion algorithm using Protocol Data Units (PDUs) captured from the radio access network, such as PDUs on the Iub and IuPS/IuCS interfaces. In step 601, the monitoring system captures control plane sessions for mobility management, call control, and session management procedures. The control plane sessions may be individual Protocol Data Units (PDUs) or aggregated call sessions, such as an attach procedure. Each session is correlated to a particular subscriber identity using the Mobile Subscriber ISDN Number (MSIDN), IP address, International Mobile Equipment Identity (IMEI), International Mobile Subscriber Identity (IMSI) or the like. The monitoring system also captures user plane voice, video, and/or data flows. The user plane flows can be individual PDUs or aggregated data sessions, such as complete http transactions. The control and data plane data is captured from the Iu-PS (Packet Switched), Iu-CS (Circuit Switched) and Iub interfaces.

Multiple monitoring or data source points would provide a more complete analysis. The service provider evaluates the efficiency of their monitoring system and determines how many monitors are needed. It will be understood that the monitoring system may capture data from one, all or any combination of the Iu-PS/CS and Iub interfaces. The Iub interface may provide more relevant information, such as RRC measurement, initial RAB request, and RAB assignment messages. Alternatively, other radio network interfaces in systems complying with other wireless standards may also be monitored for similar data. In one embodiment, devices within the radio network, such as Node Bs, base station subsystems (BSS), or base station controllers (BSC), may send interface data to the monitoring system.

In step 602, the cell congestion application, which may be running on a monitoring probe, for example, then identifies the radio access cells in a network and correlates mobile subscribers to each cell. The monitoring system then analyzes RANAP, ALCAP, RRC, Node B Application Part (NBAP), GMM transactions for cell capacity and radio bearer degradation, analyzes data service for transport plane QoS degradation (e.g. TCP retransmissions, round trip time to user equipment, fragmentation, . . . ), analyzes abnormal mobile application behavior such as applications that violate the 3GPP specification. The probe monitors QoS KPIs and congestion statistics for the Iu-CS, Iu-PS and Iub interfaces. In one embodiment, the data collected from the RAN allows the monitoring system to determine the quality of a cell, such as the number subscribers attached to the cell. The monitoring system automatically identifies radio access requests and identifies the top congested cells. The monitoring system also correlates subscribers to one or more cells. For example, in a soft handover scenario, a subscriber may have multiple access bearers for multiple cells. Other sources of congestion are limited physical resources supporting the radio cell or the transmission backhaul links.

In step 603, using the data from the Iu-CS, Iu-PS and Iub interfaces, the monitoring system evaluates if one or more cells are at a "near congestion" state. The near congestion state may be defined, for example, as a cell being within a certain percentage of congestion, such as operating at 80% of its maximum capacity. If the cell is not at near congestion, then the monitoring system continues to evaluate the congestion statistics and QoS KPIs in step 602.

If the cell does meet the "near congestion" criteria in step 603, then a near congestion trigger is sent in step 604. The near congestion trigger can be sent to devices outside the RAN, such as a PCEF, PCRF, GW or GGSN, that do not have direct knowledge of the status of cells in the RAN. The devices can then implement or enforce policy rules based on the near congestion status of the cells.

In step 605, the monitoring system continues to capture PDUs and session data from the Iu-CS, Iu-PS and Iub interfaces. In step 606, the monitoring system updates the trends for the QoS KPIs and congestion statistics. In step 607, the monitoring system evaluates whether one or more cells have reached a "congested" state. The congested state may indicate, for example, that the cell has reached or is approaching maximum capacity. If the cell is not congested, then the monitoring system continues to evaluate the congestion statistics and QoS KPIs in step 606. Alternatively, if the cell congestion has dropped below the near congestion level, then the flow may return to step 602.

If the cell is congested, the monitoring system sends a congested trigger in step 608. The congested trigger can be sent to devices outside the RAN, such as a PCEF, PCRF, GW or GGSN, that do not have direct knowledge of the status of cells in the RAN. The devices can then implement or enforce policy rules based on the congested status of the cells.

In one embodiment, to prevent hysteresis or frequent cycling between uncongested, near congestion and congested states, the monitoring system may require that the cell be in a state for a predetermined time before sending the near congestion trigger (604) or congested trigger (608). For example, the monitoring system may require a cell to be operating at 80% of capacity or greater for five minutes before sending the near congestion trigger.

FIG. 7 is a high-level block diagram of components in a UMTS network. Node Bs 701 service subscribers in respective cells 702 and are connected to RNC 703 via an Iub interface. RNC 703 is coupled to SGSN 704 via an Iu-PS interface and to MSC 705 via an Iu-CS interface. SGSN 704 is coupled to GGSN 706 via a Gn interface and is coupled to PDP/PEP 707. A monitoring system, including, for example, probes 708 and monitoring system controller 709 are coupled to the Iub and/or the Iu interfaces. Probes 708 collect PDUs and session data from the interfaces, such as RRC and NBAP messages from the Iub interfaces and ALCAP and RANAP messages from Iu interfaces. The monitoring system processes the collected data to determine the congestion status for cells 702. Monitoring system controller 709 sends triggers to PDP/PEP 707 when the radio access messages associated with cell 702a and/or cell 702b indicate that the cells are at the near congestion or congested threshold.

The monitoring system may be located in one location, such as a server or equipment rack in which probes 708a and 708b run on separate blades. Alternatively, probes 708a and 708b may be located near RNC 703 or SGSN 704 and remote from monitoring system controller 709. Probes 708 and monitoring system controller 709 comprises one or more processors running one or more software applications, such as a cell congestion application. The cell congestion application may be embodied as a plurality of state machines that monitor and aggregate information for the network cells. Probes 708 may provide captured data to monitoring system controller 709, which analyzes the data using the cell congestion application and sends triggers to PDP/PEP 707 as appropriate. Alternatively, probes 708 may run the cell congestion application and send triggers to PDP/PEP 707 either directly or through monitoring system controller 709.

The triggers or alerts sent to the PDP and/or PEP may include, for example:
  subscriber identifier (MISIDN, IMSI),
  type of service requested,
  subscriber IP address,
  cell ID (cell global ID, CGI),
  time of day, and
  threshold condition at cell.

The subscriber identifier may be used to look up the policies that apply to the subscriber. The IP address may be used to determine which policies to enforce. For example, the service provider may allow high revenue producing subscribers or services to continue, while dropping lower revenue producing subscribers or services.

In one embodiment, the cell congestion application is based on:
  RANAP signaling on the Iu interface based on the following transactions and cause codes:
    "Relocation Preparation Procedure" (RNC to CN) with cause code "Reduce load in serving cell," or
    "Relocation Failure" (CN to RNC) with cause code "Traffic load in the target cell higher than in the source cell" or "No radio resource available in target cell;"
  ALCAP signaling on the Iu interface; and
  RRC signaling on the Iub interface based on the following transactions and cause codes and conditions:
    Abnormal radio bearer connection time,
    # subs camped on a cell (with or without data sessions), and
    Measurement Reports indicating excessive noise level in a cell, which indicates congestion within the cell The RCC signaling captured from the Iub interface is the most important data because it provides information specific to individual cells, while the Iu data is related to a group of cells.

The cell congestion triggers may be sent when the number of subscribers reaches predetermined threshold levels. Alternatively, the following trigger examples illustrate triggers that are sent upon detection of specific messages in the RAN.

Trigger 1. When a subscriber is prevented from making a connection/RAB or when an existing connection/RAB is released due to congestion, an RRC cause value is assigned to that event. There are four possible RRC cause values associated with these events:
  Rejection cause: Congestion; or
  Release cause: Congestion, re-establishment reject, or pre-emptive release.

The ID for the cell where the rejected/released mobile is trying to make a connection is known. Using this information, the cell congestion application can narrow down the RRC cause value to a specific Iub connection (SCTP association) where the problem is occurring and the specific cell ID where this is occurring. This information is provided to the PEP with the congestion trigger.

Trigger 2. When a NodeB tells an RNC that the NodeB has no more resources available, there are three cause values that could signify this information. These cause values are not specific to a subscriber, but are associated with the NodeB generally reporting to the RNC regarding resource non-availability. The NBAP cause values are:
  Downlink (DL) radio resources not available,
  Uplink (UL) radio resources not available, and
  Node B Resources Unavailable.

These cause values could be used as a trigger point and the corresponding Iub connection (SCTP association) or Virtual Path Identifier (VPI), Virtual Channel Identifier (VCI), Call ID (CID), or ATM Port can be sent as a trigger to the PEP.

Trigger 3. The monitoring probe internally calculates the Best Cell ID for each mobile. So, at any given point, the monitoring system knows how many mobiles are using each cell. By configuring a predetermined maximum number of mobiles are allowed per cell, the monitoring system could send a trigger to the PEP for that cell ID.

Trigger 4. On the user plane, it is an indication that the cell is becoming congested if data service transport protocols, such as WTP and TCP, have a Round Trip Time (RTT) that is increasing for more than one subscriber within a cell.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for enforcing network policies, comprising:
  capturing data from network interfaces and user terminal equipment;
  determining cell congestion levels based, at least in part, upon the captured data, wherein the captured data includes a Radio Access Bearer (RAB) connection rejection or release having a Radio Resource Control (RRC) cause value corresponding to congestion, re-establishment release, or pre-emptive release;
  transmitting a first alert to a network policy management entity in response to a determination that the cell has had a congestion level above a first threshold for a predetermined amount of time greater than zero, the first threshold set at a point below a maximum capacity of the cell; and
  transmitting a second alert to the network policy management entity in response to a determination that the cell has a congestion level above a second threshold, the second threshold set at or near the maximum capacity of the cell.

2. The method of claim 1, further comprising:
  identifying subscribers currently active in the cell;
  identifying policies associated with the subscribers; and
  enforcing the policies based upon a current cell congestion level.

3. The method of claim 2, wherein enforcing the policies further comprises:
  limiting data provided to one or more subscribers in the cell.

4. The method of claim 2, wherein enforcing the policies further comprises:

limiting services provided to one or more subscribers in the cell.

5. The method of claim 1, wherein determining the cell congestion levels further comprises:
identifying a Node B Application Part (NBAP) cause value corresponding to Downlink (DL) radio resources not available or Uplink (UL) radio resources not available.

6. The method of claim 1, wherein the network interfaces are Radio Access Network (RAN) interfaces.

7. The method of claim 1, wherein the network interfaces comprise at least one of an Iub interface, an Iu-CS interface, or an Iu-PS interface.

8. The method of claim 1, wherein the first threshold is a near congestion threshold.

9. The method of claim 1, wherein the first threshold is 80% of the maximum capacity of the cell, and the second threshold is 100% of the maximum capacity of the cell.

10. The method of claim 1 wherein the network policy management entity is a Policy Enforcement Point (PEP), a Policy Decision Point (PDP), a Policy Charging and Control (PCC) function, a Policy and Charging Rules Function (PCRF), or a Policy and Charging Execution Function (PCEF).

11. A system for enforcing network policies, comprising:
a plurality of monitoring probes coupled to one or more network interfaces, the monitoring probes adapted to capture data from the network interfaces; and
a processor coupled to the plurality of monitoring probes and adapted to analyze the data captured from the network interfaces, the processor, in operation, configured to:
determine cell congestion levels based, at least in part, upon the captured data, wherein the captured data includes a Radio Access Bearer (RAB) connection rejection or release having a Radio Resource Control (RRC) cause value corresponding to congestion, re-establishment release, or pre-emptive release;
transmit a first alert to a network policy management entity in response to a determination that a cell has a congestion level above a first threshold, the first threshold set at a point below the cell's maximum capacity; and
transmit a second alert to the network policy management entity in response to a determination that the cell has had a congestion level above a second threshold for a predetermined amount of time greater than zero, the second threshold set at or near the cell's maximum capacity.

12. The system of claim 11, wherein the network policy management entity is adapted to identify policies associated with the subscribers currently active in the cell and to enforce the policies based upon a current cell congestion level.

13. The system of claim 12 wherein the network policy management entity is a Policy Enforcement Point (PEP), a Policy Decision Point (PDP), a Policy Charging and Control (PCC) function, a Policy and Charging Rules Function (PCRF), or a Policy and Charging Execution Function (PCEF).

14. The system of claim 11, wherein to determine the cell congestion levels, the processor, in operation, is further configured to:
identify a Radio Access Bearer (RAB) connection rejection or release having a Radio Resource Control (RRC) cause value corresponding to congestion, re-establishment release, or pre-emptive release.

15. The system of claim 11, wherein to determine the cell congestion levels, the processor, in operation, is further configured to:
identify a Node B Application Part (NBAP) cause value corresponding to Downlink (DL) radio resources not available.

16. The system of claim 11, wherein the first threshold is a near congestion threshold.

17. The system of claim 11, wherein the first threshold is 80% of the maximum capacity of the cell, and the second threshold is 100% of the maximum capacity of the cell.

18. A system for enforcing network policies, comprising:
a network policy management entity adapted to identify policies associated with subscribers currently active in a cell and to enforce the policies based upon a current cell congestion level by limiting data or services provided to one or more subscribers in the cell; and
a plurality of monitoring probes coupled to the network policy management entity and to one or more Radio Access Network (RAN) interfaces, the monitoring probes adapted to capture data from the network interfaces and further comprising a processor adapted to analyze the data captured from the network interfaces, the processor, in operation, configured to:
determine cell congestion levels based, at least in part, upon the captured data, the captured data including a Radio Access Bearer (RAB) connection rejection or release having a Radio Resource Control (RRC) cause value corresponding to congestion, re-establishment release, or pre-emptive release;
transmit a first alert to the network policy management entity in response to the cell having the current cell congestion level above a first threshold for a predetermined amount of time greater than zero, the first threshold set at a point below a cell maximum capacity; and
transmit a second alert to the network policy management entity in response to the cell having the current cell congestion level above a second threshold, the second threshold set at or near the cell maximum capacity.

19. The system of claim 18, wherein to determine the cell congestion levels, the processor, in operation, is further configured to:
identify a Node B Application Part (NBAP) cause value corresponding to Uplink (UL) radio resources not available.

* * * * *